G. MAEDA.
CAKE BAKING MACHINE.
APPLICATION FILED JULY 3, 1919.
1,356,870.
Patented Oct. 26, 1920.
2 SHEETS—SHEET 2.
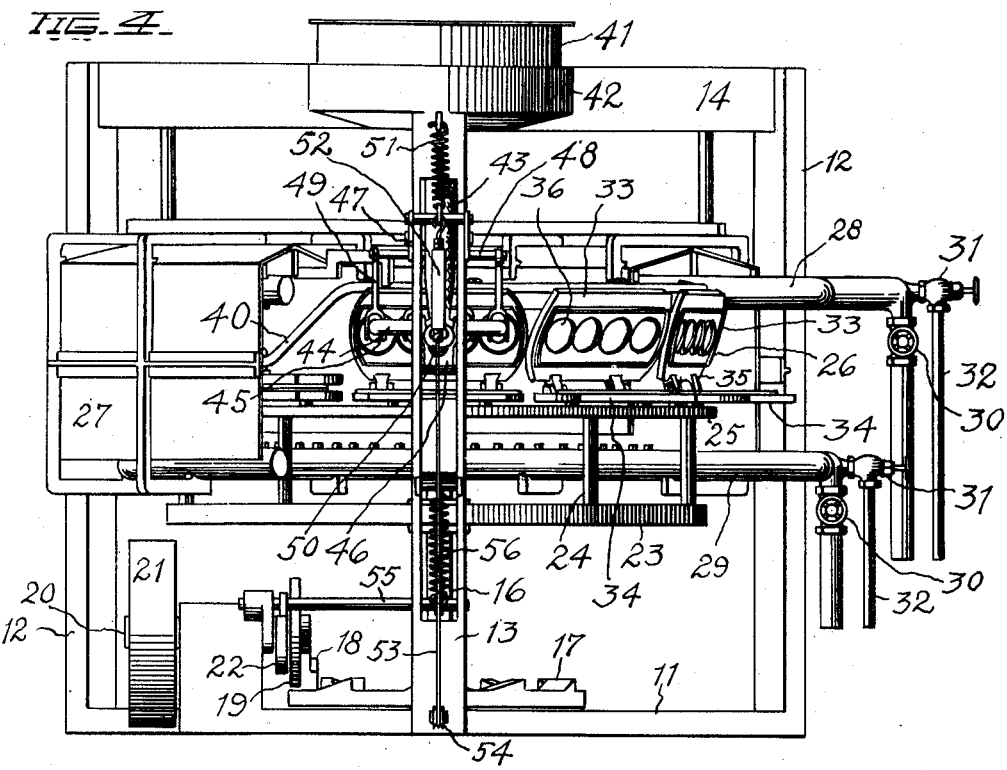
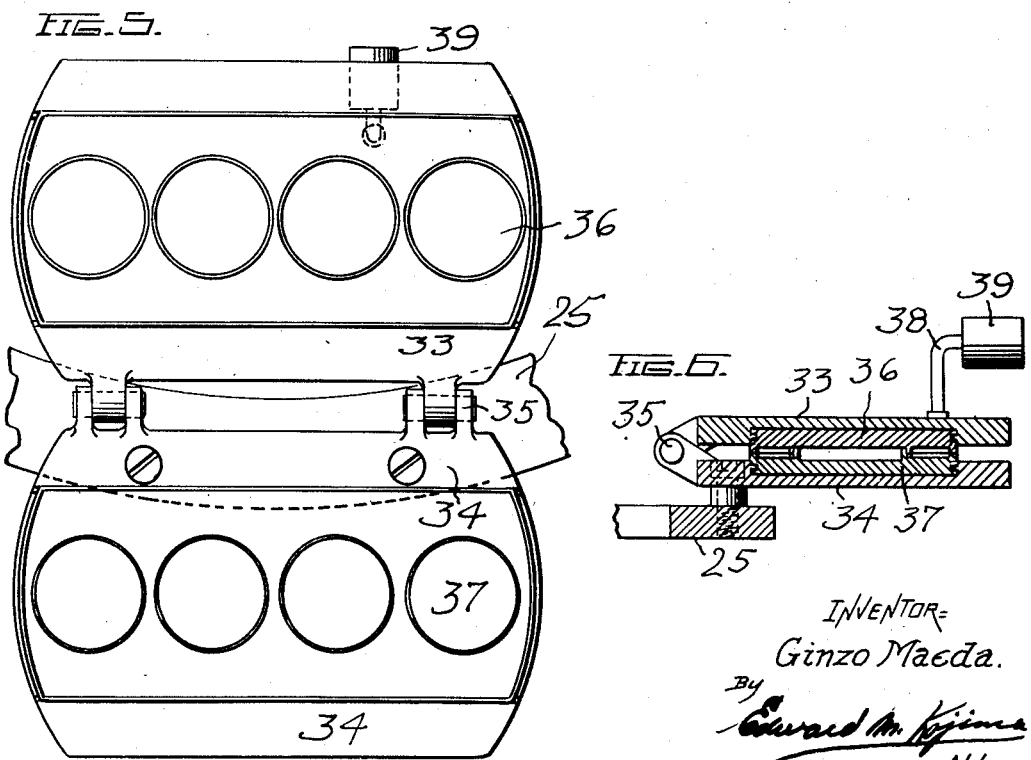
INVENTOR=
Ginzo Maeda.
By
Edward M. Kojima
Atty.

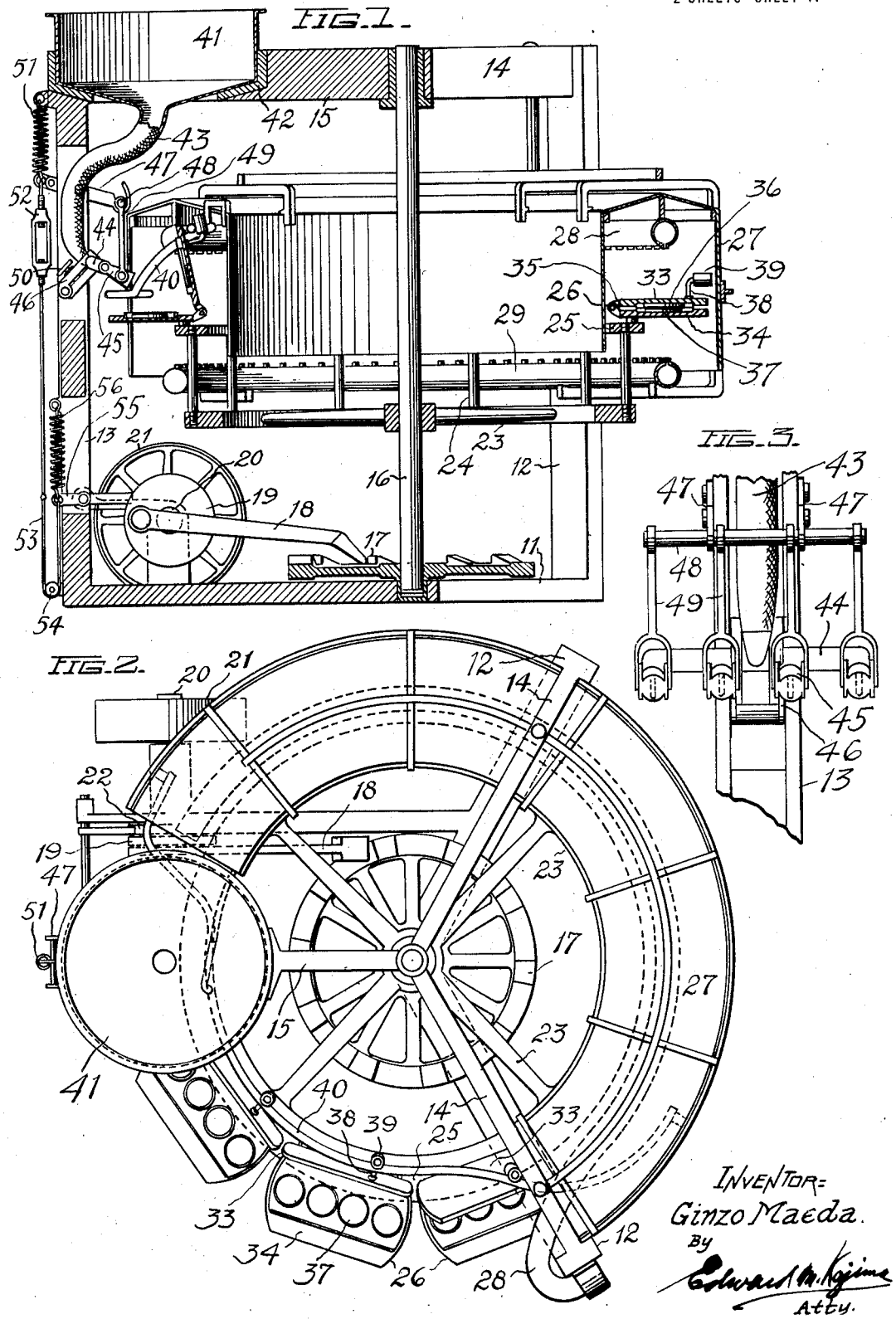

UNITED STATES PATENT OFFICE.

GINZO MAEDA, OF LOS ANGELES, CALIFORNIA.

CAKE-BAKING MACHINE.

1,356,870.     Specification of Letters Patent.     Patented Oct. 26, 1920.

Application filed July 3, 1919. Serial No. 308,533.

*To all whom it may concern:*

Be it known that I, GINZO MAEDA, a subject of the Emperor of Japan, residing in the city and county of Los Angeles and State of California, have invented a new and useful Cake-Baking Machine, of which the following is a specification.

This invention has reference to a device for baking cakes, and its objects are to provide certain useful improvements, whereby cakes, crackers, and similar baked products may be baked in an expeditious manner, and the finished product is given uniformity in size, shape and quality.

To the above ends, the invention consists of the novel devices and combination of devices hereinafter described and claimed.

Upon the annexed drawings, Figure 1 is a front elevation of a baking device embodying my invention. Fig. 2 is a top plan view of the same. Fig. 3 is a fragmentary detail view showing the batter faucets. Fig. 4 is a side elevation of the device. Fig. 5 is a detail plan view of the detachable baking member. Fig. 6 is a sectional detail view of the detachable baking member.

Referring to the drawings, my improved baking device consists of a bottom frame member 11, side frame members 12 and 13, and top frame members 14 and 15, forming a standard in which is journaled the shaft 16. The shaft 16 is provided with a ratchet wheel 17, operated by the pawl 18, and rotated for one-tenth of a turn during one revolution of the wheel 19 which is mounted on the driving shaft 20, journaled in bottom frame member 11, and provided with a driving-wheel 21, and a cam 22. The driving-wheel 21 may be actuated by any desired motive power and transmission means (not shown), as for example, an electric motor and transmission which will operate the device at a relatively low speed.

An annular supporting member 23 is fixed to shaft 16, and is provided with upwardly-extending bars 24, carrying the ring member 25, on which are mounted the detachable baking members 26. An annular oven 27, is supported by the top frame members 14 and side frame members 12, and has mounted therein the upper gaseous fuel burner 28, and lower fuel burner 29. The admission of fuel is controlled by the valve 30, and the admission of compressed air is controlled by the valve 31 in the air conduit 32, extending within the burner.

The baking pans 26 consist of upper plates 33 and lower plates 34, connected by hinges 35. Each plate is provided with a series of detachable molds, the upper molds 36 being adapted to telescope over the lower molds 37, so that, as the plates are closed, the surplus batter will be pressed out, leaving the cakes uniform in shape and size. Each upper plate of a baking pan, is provided with a bracket 38, on which is mounted a roller 39. A guide rail 40 projects within the oven and around the space between the ends of the oven. During a portion of the revolution of the pan-supporting member 25, the rollers 39 engage with guide-rail 40, and serve to open the baking pans, so that an attendant may remove the baked product, and allowing the molds to be refilled.

Means for refilling the molds consist of a batter receptacle 41, detachable, and supported by the circular portion 42, of frame member 15, a flexible conduit 43, integral with the receptacle 41, and a nozzle 44, provided with a plurality of faucets 45, and supported by the brackets 46. Means for opening the faucets at suitable intervals, consist of a tiltable lever 47, a rod 48, and links 49, pivotally connected to the closure members 57, for the faucets and to the rod 48. The faucets are adapted to be clamped within brackets 46, at a suitable angle to deliver the batter to the molds, the brackets being provided with clamp members 50. A spring 51 has one end attached to the frame member 13 and the opposite end to lever 47. A turn-buckle 52 is attached to lever 47, and a cable 53, passing over pulley 54, and connected to turn-buckle 52 and to lever 55. A spring 56 has one end attached to lever 55, and the opposite end attached to frame member 13. Lever 55 is actuated by cam 22, and the degree to which the faucets are opened is determined by the adjustment of turn-buckle 52. Spring 56 has less resistance than spring 51, and therefore, when the turn-buckle is manipulated, the normal position of lever 55 may be changed. When adjusted in horizontal position the cam 22 will tend to actuate the lever 55 through a greater arc, than when the lever 55 is adjusted in an inclined position. The spring 51 serves to retract lever 47, which is pivotally connected to standard 13, and thereby effect the closure of the faucets, when the lever 55 is released from contact with cam 22.

From the foregoing it may be seen that I have provided simple and efficient means for baking cakes and similar products in an expeditious manner. The batter receptacle, together with the conduit and faucets, is detachable and removable for purposes of cleaning and refilling new batter for making the cakes. The operation of the machine is automatic and continuous. The attendant or operator has simply to remove the baked products as the baking pans are opened. The pan carrier revolves with an intermittent rotary movement, and the discharge of the batter from the faucets is timed in accordance with the movement of the pan carrier. The molds are detachable and may therefore be made interchangeable for varying the character of the products.

What is claimed is:

1. The combination with a frame, of a vertically disposed shaft journaled therein, a wheel member mounted thereon and fixed thereto, a series of rods extending upward from the wheel member, a ring member supported by the upwardly extending rods, a series of baking pans mounted on the ring member, covers hingedly connected to the baking pans, means for rotating the wheel member with an intermittent rotary movement, an annular oven forming a closure for the wheel and ring members during the greater portion of their rotary movement, gaseous fuel burners extending within the oven and above and below the baking pans, an annular guide rail disposed above the baking pans and projecting inwardly relative to the ring and wheel member without the baking oven, brackets extending from the baking pan covers, and rollers mounted on said brackets and engaging with the guide-rail on the exposed portion thereof.

2. The combination with an annular oven open at each end and extending through the greater portion of a circle, of a rotary member mounted therein, means for actuating the rotary member with an intermittent movement whereby consecutive sections of the rotary member are relatively stationary for a period of time without the oven, baking pans carried by the rotary member, baking pan covers hingedly connected to the baking pans, detachable molds carried by the baking pans, opposed molds carried by the covers and telescoping with the first-named molds, a guide rail without the oven and above the baking pans, brackets extending from the baking pan covers, rollers mounted on the brackets and engaging with the guide rail while the baking pans are without the oven, and annular gaseous fuel burners within the oven and above and below the baking pans.

3. The combination with a frame, of a vertical shaft journaled therein, a wheel member mounted on the shaft, a series of supporting rods projecting upward from the wheel member, a ring mounted on the supporting rods, a series of baking pans mounted on the ring, and having top and bottom plates, molds detachably secured to the top and bottom plates, an annular guide rail disposed above the baking pans, brackets extending from the top plates, rollers mounted on said brackets and engaging with the guide rail during a portion of the rotary movement of the wheel member and ring, an annular oven extending over the baking pans while in the closed position, and heating means disposed within the annular oven above and below the baking pans.

4. The combination with baking pans consisting of top and bottom plates hingedly connected together, molds carried by said plates and opposed molds telescoping with one another, a rotary member, means for actuating the rotary member with an intermittent movement, a ring member supported above the plane of the rotary member, and moving synchronously therewith, said baking pans being mounted on the ring, an annular oven extending the greater portion around the ring and rotary member and inclosing the baking pans, means for holding the baking pans open when without the oven, and annular gaseous fuel burners disposed within the oven and above and below the baking pans.

In testimony whereof I hereunto affix my signature this 26th day of June, 1919.

GINZO MAEDA.